United States

Moore, III.

[11] B 3,920,996
[45] Nov. 18, 1975

[54] LOSS OF POWER INDICATOR
[75] Inventor: Harry W. Moore, III., St. Croix Beach, Minn.
[73] Assignee: Sperry Rand Corporation, New York, N.Y.
[22] Filed: Sept. 19, 1973
[21] Appl. No.: 398,625
[44] Published under the Trial Voluntary Protest Program on January 28, 1975 as document no. B 398,625.

[52] U.S. Cl. ............... 250/459; 250/462; 250/467; 350/160 LC
[51] Int. Cl.² .......................................... G01T 1/10
[58] Field of Search .......... 250/458, 462, 463, 460, 250/459, 467; 350/160 LC

[56] References Cited
UNITED STATES PATENTS
3,038,271  6/1962  MacHutchin et al. .......... 250/462 X
3,071,105  1/1963  Wertheimer .................... 250/458 X
3,322,485  5/1967  Williams ....................... 350/160 LC Primary Examiner—James W. Lawrence
Assistant Examiner—Davis L. Willis
Attorney, Agent, or Firm—Thomas J. Nikolai; Kenneth T. Grace; Marshall M. Truex

[57] ABSTRACT

A small container, with one transparent face, is filled with a source of $\alpha$ or $\beta$ radiation emitting material. The face opposite the transparent face is coated with a phosphor which when excited by the $\alpha$ or $\beta$ radiation will cause the phosphor to glow. Affixed to the transparent face of the container is a liquid crystal cell which is opaque whenever a predetermined voltage is applied thereto. Upon power failure, the liquid crystal becomes transparent, allowing the glowing phosphor to be observed.

2 Claims, 1 Drawing Figure

U.S. Patent Nov. 18, 1975 3,920,996
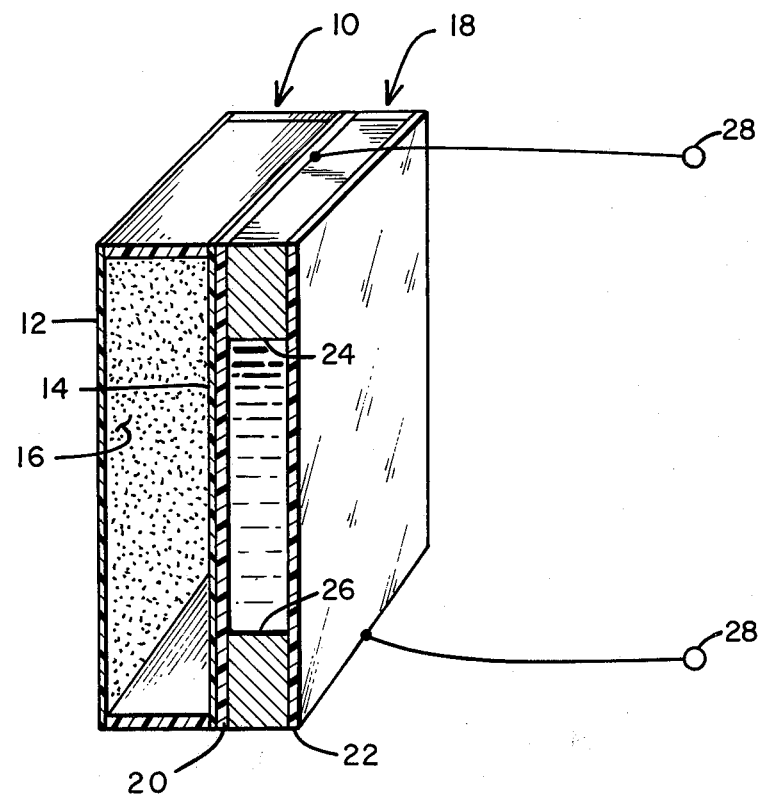

LOSS OF POWER INDICATOR

BACKGROUND OF THE INVENTION

There are countless applications for a device which will give an observable manifestation that electrical power to a machine or appliance has failed, even in total darkness. All of the prior art power failure indicators of which I am aware require an auxiliary source of power, such as a battery supply, to operate the indicator device itself when the main power supply fails.

The present invention differs from such prior art devices in that it switches to its active state when the power applied thereto drops below a predetermined threshold and provides a visible manifestation of this fact without requiring an auxiliary source of power.

In its simplest form, the loss of power indicator of this invention comprises a sealed container having one optically transparent face. The face opposite this transparent face is coated with a suitable phosphor material and also enclosed within the container is a source of $\alpha$ or $\beta$ radiation which constantly stimulates the phosphor, causing it to glow. Juxtaposed with the transparent face is a liquid crystal cell which is energized by the voltage source being monitored. When a predetermined voltage is present, the liquid crystal cell will be opaque thereby blocking the light from the irradiated phosphor. Upon power failure, the liquid crystal cell will become transparent and the light output from the phosphor will become visible.

OBJECTS

Accordingly, it is the primary object of this invention to provide a new and improved power failure indicator.

Another object of the invention is to provide an indicator which will give a visual manifestation of a loss of electrical power, without the need for an auxiliary power source.

These and other objects and advantages of this invention will become apparent to those skilled in the art from the following detailed description of the accompanying drawing which illustrates the preferred embodiment of my invention.

DESCRIPTION OF THE PREFERRED EMBODIMENT

Referring now to the FIGURE, there is shown a greatly enlarged and somewhat diagramatic view of the loss of power indicator of this invention. In the FIGURE there is illustrated a sealed container 10 having a rear surface 12 and a front surface 14. Deposited on the rear surface 12 is a coating of a phosphor material 16 which when irradiated with $\alpha$ or $\beta$ radiation will give off a characteristic glow in the visible spectrum. A suitable source of $\alpha$ and $\beta$ radiation such as, for example, Polonium-208 or Thorium-228 may be enclosed within the sealed container 10 behind the phosphor or mixed with the phosphor coating 16 and deposited on the rear surface 12. These materials are a very low emitter of $\alpha$ radiation and, accordingly, are safe to use in this application.

The front surface 14 of container 10 is made from an optically transparent material such as glass or any other suitable substantially transparent plastic material.

Disposed in front of the transparent surface 14 of container 10 is a liquid crystal cell 18 which, as will be described more fully hereinbelow, acts as a light valve or shutter. The cell 18 is comprised of first and second light polarizing sheets 20 and 22 which are maintained in parallel but spaced apart relationship by spacers 24 and 26 which are sealed to the light polarizing sheets 20 and 22 by a suitable adhesive. The spacing between these two sheets is greatly exaggerated in the drawing and in practice may only be 250 microns. A thin transparent metallic coating is applied to the surface of the polarizing sheets 20 and 22 by any one of a number of deposition techniques and the electrical leads 28 are connected to these metallic coatings. The metallic coatings serve as electrodes.

Contained within the chamber defined by the polarizing sheets 20 and 22 and the spacers 24 and 26 is a layer of field-effect nematic liquid crystalline composition capable of operating in the twisted mode. Nematic liquid crystals are organic substances made up of rodlike molecules. The so-called nematics phase is a discrete state of matter, bounded at high temperature by the transition to isotropic liquid and at low temperature by the transition to solid-state. Molecular position in the nematic phase is unordered and random, but it is found that molecules tend to align with their long axes parallel. As such, the material pours like a liquid but behaves optically like a uniaxial crystal. Many liquid crystal materials are known in the art. For a listing of nematic materials suitable for the present application, reference is made to the Haas et al. U.S. Pat. No. 3,687,515 which sets forth not only a group of organic chemical compositions that exhibit the desired properties, but also describes methods and materials for fabricating such cells.

Field-effect nematic crystals cause the plane of polarization of incident light to be rotated 90° when no voltage is applied to the control electrodes. When a voltage is applied, no rotation of the plane of polarization of the incident light occurs. This property is utilized in the liquid crystal cell 18 of the present invention. Specifically, the polarizing layers 20 and 22 are oriented with their directions of polarization orthogonal to one another. Thus, when an electric field (voltage) is applied to the terminals 28, the plane of polarization of the incident light from the irradiated phosphor coating 16 will not be rotated and no light will be transmitted through the polarizing sheet 22. However, when no voltage is applied between the terminals 28 (such as occurs during a power failure) the plane of polarization of the light passing through the polarizer sheet 14 will be rotated by the liquid crystal material by 90° and will pass through the polarizing sheet 22 to give an observable manifestation of the fact that no voltage exists between the electrodes 24 and 26.

By depositing the phosphor material 16 on the rear surface 12 of container 10 through a stencil or mask, it is possible to have alphanumeric information displayed whenever the liquid crystal light shutter 18 is in a transmissive mode.

It will be understood that various changes in the details, materials, and arrangements of elements which have been described and illustrated herein in order to explain the nature of the preferred embodiment will occur to those skilled in the art after reading this disclosure and such changes are intended to be included within the scope of the invention.

What is claimed is:

1. A method of providing an observable manifestation of a drop in electrical voltage comprising the steps of:

a. providing a self-contained radiation stimulated phosphor light source;
b. positioning a nematic liquid crystal electrooptic type cell in the path between said light source and an observer; and
c. connecting the electrodes of said cell to the electrical voltage to be monitored such that when said voltage is above a predetermined threshold said cell is optically opaque and when said voltage is below said threshold, said cell is optically transparent.

2. An article of manufacture, comprising a compartment having a predetermined area therof optically transparent and containing a radiation stimulated phosphor, said optically transparent area being covered with a first sheet of light polarizing material having a transparent metallic coating on on surface thereof, a second sheet of light polarizing material having a transparent metallic coating on one surface thereof held in a parallel but spaced apart relationship to said first sheet by a gasket, the space being filled with organic nematic liquid crystal material and electrical leads connected to said metallic coatings on said first and second sheets.

* * * * *

UNITED STATES PATENT OFFICE
CERTIFICATE OF CORRECTION

Patent No. 3,920,996      Dated November 18, 1975

Inventor(s) Harry W. Moore, III

It is certified that error appears in the above-identified patent and that said Letters Patent are hereby corrected as shown below:

IN THE PRINTED PATENT:

COLUMN 4, CLAIM 2, LINE 6

Before the word "surface", change "on" (second occurrence) to -- one -- .

Signed and Sealed this twenty-fourth Day of February 1976

[SEAL]

Attest:

RUTH C. MASON
*Attesting Officer*

C. MARSHALL DANN
*Commissioner of Patents and Trademarks*